United States Patent
Rahamim et al.

(10) Patent No.: US 6,537,071 B2
(45) Date of Patent: Mar. 25, 2003

(54) APPARATUS FOR AUTOMATICALLY FEEDING AND INSERTING MEMBERS INTO BRAILLE SIGNS

(75) Inventors: Reuven Rahamim, St. Louis Park, MN (US); David F. Birch, Minneapolis, MN (US)

(73) Assignee: Accent Signage Systems, Inc., Minneapolis, MN (US)

( * ) Notice: Subject to any disclaimer, the term of this patent is extended or adjusted under 35 U.S.C. 154(b) by 0 days.

(21) Appl. No.: 09/915,961

(22) Filed: Jul. 27, 2001

(65) Prior Publication Data

US 2003/0022137 A1 Jan. 30, 2003

(51) Int. Cl.$^7$ ................................. G09B 21/02
(52) U.S. Cl. ..................... 434/113; 434/115; 434/112
(58) Field of Search ........................ 434/112, 113, 434/114, 115, 117; 29/525

(56) References Cited

U.S. PATENT DOCUMENTS

| | | | | |
|---|---|---|---|---|
| 3,598,042 A | * | 8/1971 | Boyd | 434/114 |
| 3,876,051 A | * | 4/1975 | Joffe | 434/114 |
| 4,261,663 A | * | 4/1981 | Grimnes | 400/122 |
| 4,772,205 A | * | 9/1988 | Chlumsky | 434/114 |
| 5,245,744 A | * | 9/1993 | Edgerton | 434/113 |
| 5,720,616 A | * | 2/1998 | Schuler | 434/113 |
| 5,746,518 A | * | 5/1998 | Ogawa | 400/109.1 |
| 5,803,741 A | * | 9/1998 | Deng | 434/115 |
| 6,241,405 B1 | * | 6/2001 | Burman | 400/109.1 |

* cited by examiner

Primary Examiner—Derris H. Banks
Assistant Examiner—Kurt Fernstrom
(74) Attorney, Agent, or Firm—Gary L. Huusko

(57) ABSTRACT

An apparatus is disclosed for automating the insertion of spherically and non-spherically shaped members on an architectural sign face into pre-drilled holes in the sign corresponding to the pattern of Braille letters designed to be formed in the sign. A device is disclosed for holding a reservoir of spherically or non-spherically shaped members, delivering the members from the reservoir pan to a spindle and hammer assembly whereby the member is forcibly inserted into the pre-drilled hole on the sign face by the spindle and hammer in an arrangement desired for accurately duplicating Braille letters.

10 Claims, 3 Drawing Sheets

APPARATUS FOR AUTOMATICALLY FEEDING AND INSERTING MEMBERS INTO BRAILLE SIGNS

The present invention relates generally to an apparatus for automatically feeding and inserting members, both spherical and non-spherical, such as ball bearings and elongated members with a rounded tip, respectively, into pre-drilled holes to form Braille letters on architectural and other signs.

BACKGROUND ART

Signs in buildings that direct people from place to place or identify locations sometimes have a message both in print, to be read by sighted people, and in Braille to be read by blind people. There has been a general trend toward putting Braille on signs, but this trend has been greatly accelerated because of federal legislation requiring that Braille be placed on architectural signs, both new and old.

There is disclosed in U.S. Pat. Nos. 5,245,744 and 5,403,189 a method and apparatus for placing spherically shaped members into holes on sign faces to form Braille letters. Those patents, however, required manually inserting each member into a hole, which was both time consuming, labor intensive and inefficient. The present invention automates that process, thereby allowing for increased productivity and savings of both time and labor cost.

Accordingly, there is a need for an apparatus for applying Braille to a sign face that overcomes the aforementioned problems.

DISCLOSURE OF THE INVENTION

The present invention relates to an apparatus for automatically feeding and inserting members, both spherical and non-spherical, into pre-drilled holes thereby creating Braille letters or cells on an architectural or other sign face.

A device is disclosed for storing and automatically feeding and inserting spherically and non-spherically shaped members or the like into pre-drilled holes formed in a sign face, whereby Braille letters are formed in the sign face.

An object of the present invention is to provide an improved apparatus for placing Braille letters on an architectural sign face.

Another object of the present invention is to provide an apparatus for placing Braille letters on an architectural sign face which is inexpensive and which is simple to use.

A still further object of the present invention is to provide an apparatus for economically, easily, quickly and dependably inserting spherically and non-spherically shaped members or the like into holes in a sign face for making Braille signs.

A still further object of the present invention is to provide a simple, automatic and dependable apparatus for inserting spherically and non-spherically shaped members into the holes formed in the sign face by the aforementioned apparatus.

Other objects, advantages, and novel features of the present invention will become apparent from the following detailed description of the invention when considered in conjunction with the accompanying drawings.

DETAILED DESCRIPTION OF DRAWINGS AND BEST MODE FOR CARRYING OUT THE INVENTION

Figure 1:
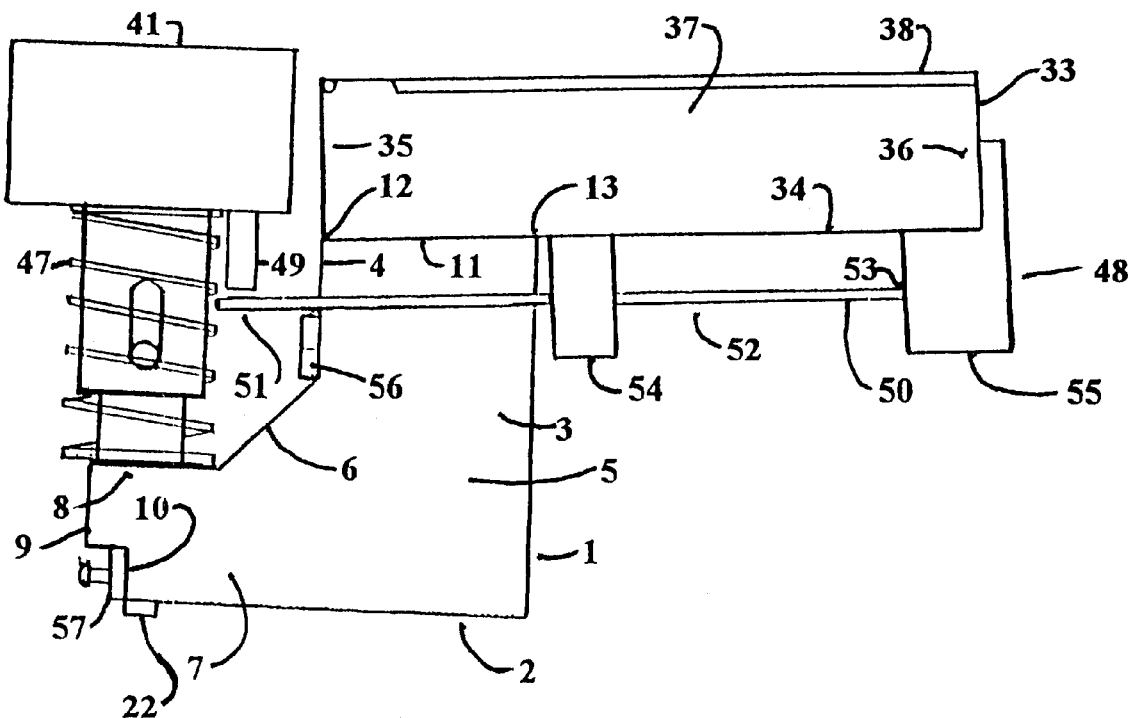
FIG. 1 is a side view of an apparatus constructed in accordance with the present invention.

Referring now to the drawings wherein like reference numerals designate identical or corresponding parts throughout the several views, FIG. 1 shows an apparatus constructed in accordance with the present invention for automatically feeding and inserting spherically and non-spherically shaped members or the like into pre-drilled holes in a sign face in a pattern corresponding to Braille letters to produce a sign face with Braille lettering in addition to the normal printed lettering.

The apparatus.shown in FIG. 1 includes a body 1 having a bottom surface 2, an upper portion 3, said upper portion 3 having a vertical front face 4, a middle portion 5 having a diagonal front face 6, and a lower portion 7 extending outward from the middle portion 5 and having a lower portion top side 8, an outer vertical front face 9 and an inner vertical front face 10 indented from the outer vertical front face 9. The body 1 can be constructed as a single machined piece of material, or as two halves, machined to its particular specifications and attached together with screws or the like.

Still referring to FIG. 1, the body 1 further comprises a top 11, a front top edge 12 and a back top edge 13, the top 11 being angled slightly downwards from the back top edge 13 to the front top edge 12, the preferred embodiment having the upper portion 3 extend down for a length of approximately 0.482 inches, the middle portion 5 extending down diagonally approximately 0.4106 inches and the lower portion 7 extending down approximately 0.4134 inches. Of course, those approximate lengths can be more or less, and can vary according to the size of the apparatus desired.

Figure 2:
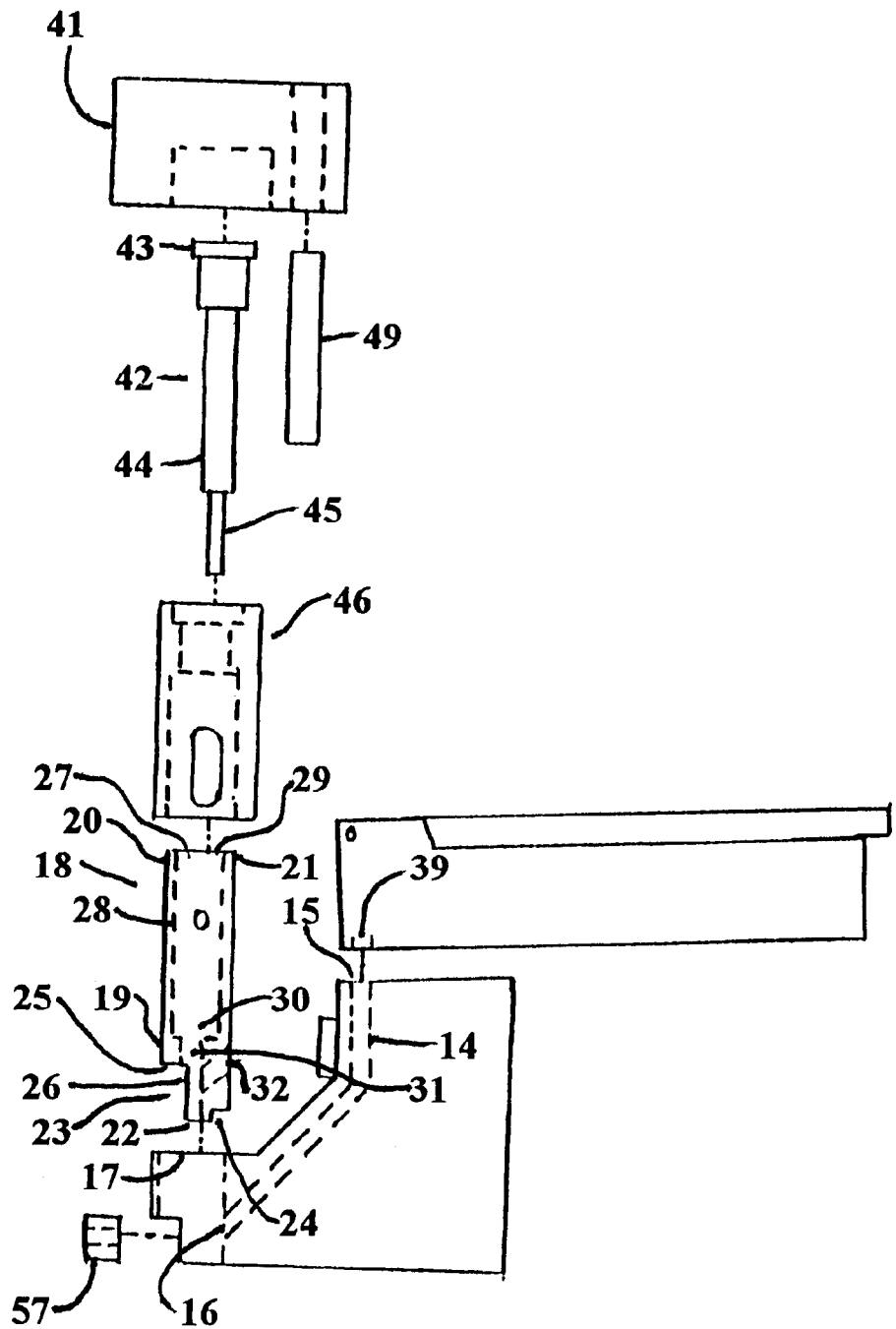
FIG. 2 is an exploded view of the apparatus shown in FIG. 1, excluding the hammer assembly.

Referring now to FIG. 2, a tubular delivery means 14 is situated within the body 1, either through boring or machining to achieve a pathway in which the spherically and non-spherically shaped members will travel through the body 1. The tubular delivery means 14 has an upper opening 15 in the top 11 of the body 1 near the front top edge 12 and a lower opening 16 extending into the lower portion 7 of the body 1. The preferred embodiment of the tubular delivery means 14 is to have the tubular delivery means 14 situated within the body 1 parallel to the vertical front face 4 of the upper portion 3 for approximately the length of the upper portion 3 and then bending at an angle to be parallel to the diagonal front face 6 of the middle portion 5 of the body 1 and continuing straight at that same angle into the lower portion 7. A circular bore 17 is made in the lower portion 7, extending vertically from the lower portion top side 8 through the entire lower portion 7.

Referring to FIGS. 1 and 2, a spindle assembly 18 is mounted within and fixedly attached to the circular bore 17 within the lower portion 7 of the body 1, preferably with a screw or a plurality of screws, although other attaching means may also be used. The spindle assembly 18, is comprised of a cylindrical spindle 19 with an outer spindle surface 20, a spindle top 21, and a spindle bottom 22. The spindle bottom 22 is comprised of a cutout portion 23 and an annular notched portion 24, situated immediately below the cutout portion 23 and extending slightly below the bottom surface 2 of the body 1. The cutout portion 23 is comprised of a cutout portion top 25 and a cutout portion front face 26, whereby the cutout portion front face 26 is flush with the inner vertical front face 10 of the lower portion 7 of the body 1. The preferred embodiment would have the annular notched portion 24 approximately 0.05 inches long with a resulting diameter of approximately 0.127 inches, however, these specifications may vary depending once again on the overall size of the apparatus desired. A first cylindrical bore 27 is disclosed through the center of the spindle assembly 18 and extends from the spindle top 21 to a point approximately two-thirds the length of the spindle assembly 18, the first cylindrical bore 27 having a circumference 28, a top aperture 29 and a bottom portion 30. The preferred embodiment of the first cylindrical bore 27 would disclose a diameter of 0.1560 inches, although that diameter may vary depending upon the desired size of the apparatus. A second cylindrical bore 31 extends from the bottom portion 30 of the first cylindrical bore 27 to the spindle bottom 22. The preferred embodiment of the second cylindrical bore 31 would disclose a diameter of approximately 0.067 inches, although that diameter may vary depending upon the desired size of the apparatus. The preferred embodiment of the cutout portion 23 of the spindle bottom 22 would disclose that the cutout portion 23 extends inward approximately 0.1005 inches, thereby forming the cutout portion top 25, and extends upward from the spindle bottom 22 approximately 0.2134 inches, thereby forming the cutout portion front face 26. Again, depending upon the desired size of the apparatus, these measurements may vary. A third cylindrical bore 32 is disclosed opposite the cutout portion 23 of the spindle bottom 22 and extending upwards from the second cylindrical bore 31 at an approximate 45-degree angle through to the outer spindle surface 20.

Referring now to FIG. 1, fixedly attached to the top 11 of the body 1 is a reservoir pan 33 that holds a plurality of spherically or non-spherically shaped members such as ball bearing members or the like. The spherically and non-spherically shaped members would preferably be made out of acrylic, however, other materials would work equally as well. FIG. 1 shows the components of the reservoir pan 33. A reservoir pan bottom 34, a reservoir pan front end 35, a reservoir pan back end 36, a plurality of reservoir pan sides 37, and a reservoir pan cover 38 hingedly attached to the reservoir pan 33 are disclosed.

Referring to FIG. 2, the reservoir pan bottom 34 has a hole 39 of sufficient diameter to allow the travel of the spherically or non-spherically shaped members from the reservoir pan 33 to the tubular delivery means 14, the hole 39 being located such that it aligns with the tubular delivery means 14 of the body 1. The reservoir pan 33 is attached to the top 11 of the body 1 whereby the hole 39 in the reservoir pan bottom 34 aligns with the upper opening 15 of the tubular delivery means 14 in the body 1.

Figure 3:
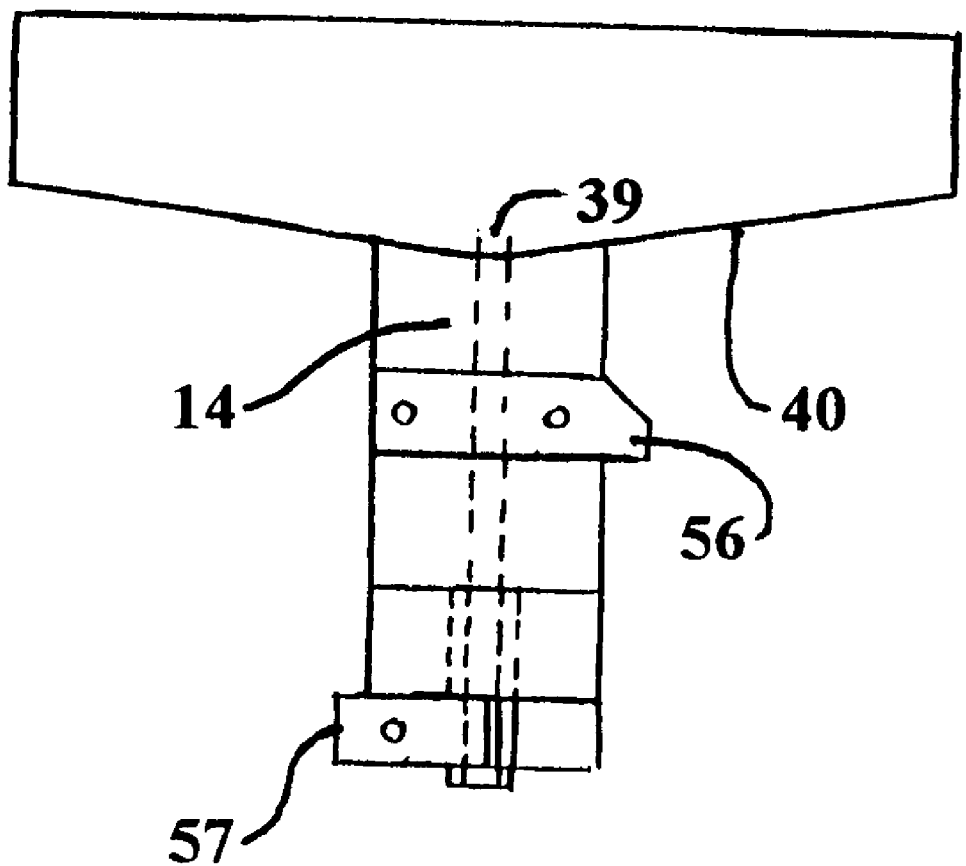
FIG. 3 is a front view of the body and reservoir pan of the apparatus shown in FIG. 1.

The preferred embodiment of the reservoir pan 33 discloses a syncline bottom 40, as shown in FIG. 3 with the lower portion of the syncline running along the midline of the reservoir pan bottom 34 from the reservoir pan back end 36 to the reservoir pan front end 35. Accordingly, the preferred embodiment of the shape of the body top 11 is syncline as well, to allow for a firm attachment between the body 1 and the reservoir pan 33.

Referring now to FIG. 2 a cap 41 with an attaching means is disclosed, whereby the attaching means can attach to computerized routing or engraving equipment. A main pin 42 having a pin top 43, a pin upper portion 44 of a sufficient diameter to slide within the first cylindrical bore 27, and a pin lower portion 45 of a sufficient diameter to slide within the second cylindrical bore 31 is disclosed and is slidable within the spindle assembly 18. The pin top 43 is fixedly attached to the cap 41, thereby moving up and down in concert with the movement of the computerized routing or engraving equipment.

Referring still to FIG. 2 a barrel assembly 46 is fixedly attached to the cap 41 whereby the barrel assembly 46 is slidably connected to and disposed around the spindle assembly 18, thus allowing the barrel assembly 46 to freely move within a predetermined range up and down about the spindle assembly 18. The predetermined range can be controlled by various means, such as that shown in the preferred embodiment. The preferred embodiment discloses a slot or plurality of slots in the barrel assembly 46, within which a screw or pin or the like that is fixedly attached to the spindle assembly 18 can slide.

A barrel spring 47 is disposed around the barrel assembly 46 between the cap 41 and the lower portion 7 of the body 1, thereby acting as a compression spring to cause the main pin 42 to move upwards in the spindle assembly 18, as shown in FIG. 1.

Referring to FIG. 1 a hammer assembly 48, comprising a hammer cocking pin 49 fixedly attached to the cap 41, a hammer spring rod 50 comprising a first end 51, a middle 52 and a second end 53. A hammer 54 fixedly attached to the middle 52 of the hammer spring rod 50, and a hammer mount 55 fixedly attached to the second end 53 of the hammer spring rod 50 and fixedly attached to the reservoir pan 33 are also disclosed. A hammer trigger 56 fixedly attached to the vertical front face 4 of the upper portion 3 of the body 1 is disclosed, whereby the hammer cocking pin 49 pushes the hammer spring rod 50 past the hammer trigger 56, thereby cocking the hammer 54 and causing its release, whereby the hammer 54 strikes the reservoir pan bottom 34 causing the spherically or non-spherically shaped members to be moved by vibration resulting from the strikin of the hammer 54 on the reservoir pan bottom 34.

Referring now to FIG. 3, the hammer trigger 56 is shown as attached to the vertical front face 4 of the upper portion 3 of the body 1. A toe clip 57 is also disclosed. The toe clip 57 is adjustably attached to the inner vertical front face 10 of the lower portion 7 of the body 1 with a spring screw or another such adjustable attaching means.

In operation, in order to practice the invention:

The apparatus operates in concert with the routing or engraving equipment. As the router or engraving equipment is programmed to move up or down, the spherically or non-spherically shaped members held in the reservoir pan 33 sequentially drop into the hole 39 in the reservoir pan bottom 34 and travel down the tubular delivery means 14, the downward motion aided by gravity, and each spherically or non-spherically shaped member then continues to travel through the tubular delivery means 14 at which time the spherically or non-spherically shaped member enters the third cylindrical bore 32 and continues down the third cylindrical bore 32 and enters the second cylindrical bore 31, at which time the spherically or non-spherically shaped member is stopped by contacting the toe clip 57. The continued downward movement of the routing or engraving equipment to which the apparatus is attached causes the body 1 to contact the sign face, thereby compressing the barrel spring 47 which pushes the barrel assembly 46 along with the cap 41 and the main pin 42 down, whereby the spherically or non-spherically shaped member, being held by the toe clip 57, is then pressed into the hole on the sign face by the main pin 42 as the apparatus continues its downward movement. The continued downward movement causes the main pin 42 to push the member free of the toe clip 57 and into the pre-drilled hole. The main pin 42 then acts as a valve to prevent the next or subsequent member from entering the second cylindrical bore 31.

Accordingly, it will be appreciated that the present invention does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. Apparatus for automatically feeding and inserting members into pre-drilled holes depicting Braille letters on a sign face comprising:

a body having an upper portion, said upper portion having a vertical front face, a middle portion having a diagonal front face, a lower portion, said lower portion having a lower portion top side, an outer vertical front face and an inner vertical front face, a top, a front top edge and a back top edge, the top being angled downwards from the back top edge to the front top edge;

a tubular delivery means situated within the body, the tubular delivery means having an upper opening in the top of the body and a lower opening in the inner vertical front face of the lower portion of the body;

a circular bore in the lower portion of the body, extending vertically from the lower portion top side through the lower portion;

a spindle assembly comprising a cylindrical spindle, an outer spindle surface, a spindle top, and a spindle bottom, said spindle bottom comprising a cutout portion and an annular notched portion, whereby the annular notched portion is situated immediately below the cutout portion and extends slightly below the bottom surface of the body;

the spindle assembly further comprising a first cylindrical bore having a circumference, a top aperture and a bottom portion, and extending from the spindle top to a point two-thirds the length of the spindle assembly, a second cylindrical bore having a smaller circumference than the first cylindrical bore and extending from the first cylindrical bore bottom portion to the spindle bottom, and a third cylindrical bore opposite the cutout portion and extending up from the second cylindrical bore at an angle through to the spindle assembly outer spindle surface;

a reservoir pan having a reservoir pan bottom, a reservoir pan front end, a reservoir pan back end, a plurality of reservoir pan sides, a reservoir pan cover hingedly attached to the reservoir pan, a hole in said reservoir pan bottom, the reservoir pan being fixedly attached to the top of the body whereby the hole in the reservoir pan bottom aligns with the upper opening of the tubular delivery means in the body;

a main pin slidable within the spindle assembly, said main pin having a pin top, a pin upper portion of a sufficient diameter to slide within the first cylindrical bore, and a pin lower portion of a sufficient diameter to slide within the second cylindrical bore;

a cap with an attaching means, whereby the attaching means can attach to computerized routing or engraving equipment, the cap being fixedly attached to the main pin;

a barrel assembly slidably connected to and disposed around the spindle assembly and fixedly attached to the cap;

a barrel spring disposed around the barrel;

a hammer assembly comprising a hammer cocking pin fixedly attached to the cap, a hammer spring rod having a first end, a middle and a second end, a hammer fixedly attached to the middle of the hammer spring rod, a hammer mount fixedly attached to the second end of the hammer spring rod and fixedly attached to the reservoir pan, and a hammer trigger fixedly attached to the vertical front fare of the upper portion of the body, whereby the hammer cocking pin pushes the first end of the hammer spring rod down and over the hammer trigger thereby cocking the hammer and as the hammer spring rod continues its travel down, the hammer trigger pushes the hammer spring rod away from the hammer cocking pin, thereby causing the hammer spring rod to snap back to its original position and thereby causing the hammer to strike the reservoir pan bottom whereby the members are moved by vibration caused by the striking of the hammer on the reservoir pan bottom; and a toe clip adjustably attached to the inner vertical front face of the lower portion of the body, whereby the members are held in the reservoir pan and sequentially drop into the hole in the reservoir pan bottom and travel down the tubular delivery means, the downward motion aided by gravity, and whereby each member then continues to the end of the tubular delivery means enters the third cylindrical bore and travels into the second cylindrical bore at which time the member is stopped by contacting the toe clip, whereby the downward movement of the routing or engraving equipment to which the apparatus is attached causes the body to contact the sign face, thereby compressing the barrel spring which pushes the barrel assembly and the main pin down, whereby the member then being held by the toe clip is then pressed into the hole on the sign face by the main pin as the apparatus continues its downward movement.

2. The apparatus of claim 1 wherein the tubular delivery means is situated parallel to the vertical front face of the upper portion of the body for the length of the upper portion and then having a bend to be parallel to the diagonal front face of the middle portion of the body and continuing straight to the circular bore in the lower portion.

3. The apparatus of claim 2 wherein the reservoir pan bottom is syncline forming a midline trough from the reservoir pan back end to the reservoir pan front end, and the top of the body is syncline to accommodate attachment of the reservoir pan.

4. The apparatus of claim 3 wherein the members are spherically shaped.

5. The apparatus of claim 3 wherein the members are non-spherically shaped.

6. Apparatus for automatically feeding and inserting members into pre-drilled holes depicting Braille letters on an architectural sign face comprising:

a body 1.1607 inches in height, 1.3375 inches in length, and 0.50 inches in width, said body having an upper portion, said upper portion having a vertical front face 0.482 inches long, a middle portion having a diagonal front face 0.4106 inches long, a lower portion 0.4134 inches long, said lower portion having a lower portion top side, an outer vertical front face 0.25 inches in length and an inner vertical front face 0.1634 inches in length, a top 0.6526 inches in length, a front top edge and a back top edge, the top being angled downwards from the back top edge to the front top edge;

a tubular delivery means situated within the body, the tubular delivery means having an upper opening in the top of the body and a lower opening in the inner vertical front face of the lower portion of the body;

a circular bore in the lower portion of the body, extending vertically from the lower portion top side through the lower portion;

a spindle assembly comprising a cylindrical spindle, an outer spindle surface, a spindle top, and a spindle bottom, said spindle bottom comprising a cutout portion 0.1005 inches in depth and 0.2134 inches in height and an annular notched portion 0.50 inches in length, whereby the annular notched portion is situated immediately below the cutout portion and extends 0.50 inches below the bottom surface of the body;

the spindle assembly further comprising a first cylindrical bore with a diameter of 0.156 inches and having a top aperture and a bottom portion, and extending from the spindle top to a point two-thirds the length of the spindle assembly, a second cylindrical bore with a diameter of 0.067 inches and extending from the first cylindrical bore bottom portion to the spindle bottom, and a third cylindrical bore opposite the cutout portion and extending up from the second cylindrical bore at a 45 degree angle through to the spindle assembly outer spindle surface;

a reservoir pan having a reservoir pan bottom, a reservoir pan front end, a reservoir pan back end, a plurality of reservoir pan sides, a reservoir pan cover hingedly attached to the reservoir pan, a hole in said reservoir pan bottom, the reservoir pan being fixedly attached to the top of the body whereby the hole in the reservoir pan bottom aligns with the upper opening of the tubular delivery means in the body;

a main pin slidable within the spindle assembly, said main pin having a pin top, a pin upper portion of a sufficient diameter to slide within the first cylindrical bore, and a pin lower portion of a sufficient diameter to slide within the second cylindrical bore;

a cap with an attaching means, whereby the attaching means can attach to computerized routing or engraving equipment, the cap being fixedly attached to the main pin;

a barrel assembly slidably connected to and disposed around the spindle assembly and fixedly attached to the cap;

a barrel spring disposed around the barrel;

a hammer assembly comprising a hammer cocking pin fixedly attached to the cap, a hammer spring rod having a first end, a middle and a second end, a hammer fixedly attached to the middle of the hammer spring rod, a hammer mount fixedly attached to the second end of the hammer spring rod and fixedly attached to the reservoir pan, and a hammer trigger fixedly attached to the vertical front face of the upper portion of the body, whereby the hammer cocking pin pushes the first end of the hammer spring rod down and over the hammer trigger thereby cocking the hammer and as the hammer spring rod continues its travel down, the hammer trigger pushes the hammer spring rod away from the hammer cocking pin, thereby causing the hammer spring rod to snap back to its original position and thereby causing the hammer to strike the reservoir pan bottom whereby the members are moved by vibration caused by the striking of the hammer on the reservoir pan bottom; and a toe clip adjustably attached to the inner vertical front face of the lower portion of the body, whereby the members are held in the reservoir pan and sequentially drop into the hole in the reservoir pan bottom and travel down the tubular delivery means, the downward motion aided by gravity, and whereby each member then continues to the end of the tubular delivery means enters the third cylindrical bore and travels into the second cylindrical bore at which time the member is stopped by contacting the toe clip, whereby the downward movement of the routing or engraving equipment to which the apparatus is attached causes the body to contact the sign face, thereby compressing the barrel spring which pushes the barrel assembly and the main pin down, whereby the member then being held by the toe clip is then pressed into the hole on the sign face by the main pin as the apparatus continues its downward movement.

7. The apparatus of claim 6 wherein the tubular delivery means is situated parallel to the vertical front face of the upper portion of the body for the length of the upper portion and then having a bend to be parallel to the diagonal front face of the middle portion of the body and continuing straight to the circular bore in the lower portion.

8. The apparatus of claim 7 wherein the reservoir pan bottom is syncline forming a midline trough from the reservoir pan back end to the reservoir pan front end, and the top of the body is syncline to accommodate attachment of the reservoir pan.

9. The apparatus of claim 8 wherein the member is spherically shaped.

10. The apparatus of claim 8 wherein the member is non-spherically shaped.

* * * * *